(12) United States Patent
Pearson

(10) Patent No.: US 9,666,980 B2
(45) Date of Patent: May 30, 2017

(54) ELECTRICAL POWER STRIP HOUSING

(71) Applicant: Yolanda Pearson, Dallas, TX (US)

(72) Inventor: Yolanda Pearson, Dallas, TX (US)

( * ) Notice: Subject to any disclaimer, the term of this patent is extended or adjusted under 35 U.S.C. 154(b) by 0 days.

(21) Appl. No.: 14/708,244

(22) Filed: May 9, 2015

(65) Prior Publication Data

US 2016/0329654 A1 Nov. 10, 2016

(51) Int. Cl.
*H01R 13/60* (2006.01)
*H02G 11/00* (2006.01)
*H02G 15/02* (2006.01)
*H02G 3/00* (2006.01)
*H01R 13/72* (2006.01)
*H01R 25/00* (2006.01)

(52) U.S. Cl.
CPC ........... *H01R 13/60* (2013.01); *H02G 3/263* (2013.01); *H02G 11/003* (2013.01); *H02G 15/02* (2013.01); *H01R 13/72* (2013.01); *H01R 25/003* (2013.01)

(58) Field of Classification Search
CPC ......... H05K 7/183; H01R 13/72; H02G 11/02
USPC ...... 439/501, 528; 211/26; 248/346.03, 153, 248/262, 236
See application file for complete search history.

(56) References Cited

U.S. PATENT DOCUMENTS

| 5,775,956 | A * | 7/1998 | Sticker | ................. | H01R 9/2416 174/72 A |
| 5,794,794 | A * | 8/1998 | Hull | ......................... | H05K 7/18 211/187 |
| 5,929,381 | A * | 7/1999 | Daoud | ................. | G02B 6/4448 174/135 |
| 6,302,746 | B1 * | 10/2001 | Nath | ..................... | H02G 15/076 439/719 |
| 6,679,722 | B1 * | 1/2004 | Pulizzi | ................. | H01R 13/562 439/451 |
| 6,818,834 | B1 * | 11/2004 | Lin | ......................... | H02G 3/32 174/135 |
| 7,118,410 | B2 * | 10/2006 | Hatori | ................ | H01R 13/5833 439/501 |
| 7,140,500 | B2 * | 11/2006 | McCoy | .................... | H02G 3/30 211/60.1 |
| 2004/0188574 | A1 * | 9/2004 | Weatherly | ............ | A47B 81/061 248/161 |
| 2008/0290230 | A1 * | 11/2008 | Martin | ................. | H01R 25/006 248/213.2 |
| 2014/0242835 | A1 * | 8/2014 | Moran | ................... | H02G 3/083 439/528 |
| 2015/0303721 | A1 * | 10/2015 | Johnson | ................ | H02J 7/0042 248/51 |

* cited by examiner

*Primary Examiner* — Tulsidas C Patel
*Assistant Examiner* — Marcus Harcum
(74) *Attorney, Agent, or Firm* — Darcell Walker

(57) ABSTRACT

A housing article for an electrical power strip has the capability to hold the electrical power strip with multiple cords from various electrical devices that are plugged into the power strip. This power strip housing has an upper tray type element on which the power strip is placed. Cords extending from the power strip in the upper tray element are channeled down to a lower tray type element for storing the cords in an organized manner to on the lower tray element. The channeling of these electrical cords to the lower tray element has creates and maintains the organized bundling and storing of the electrical cords that will substantially reduce floor clutter from the cords.

6 Claims, 9 Drawing Sheets

ELECTRICAL POWER STRIP HOUSING

CROSS REFERENCE TO RELATED APPLICATION

This formal utility patent application is related to provisional patent application No. 61/991,359 filed on May 9, 2014. The contents of both applications are incorporated herein by reference.

FIELD OF THE INVENTION

This invention relates to a device that enables a user to arrange and store a power strip and electrical cords plugged into the power strip. In particular, this invention relates to a device that can house a power strip with electrical cords plugged into it. More particular, this invention relates to a device for housing a power strip with cords plugged into sockets in the power strip and arranging the electrical cords in an orderly secure manner. Finally, the present invention relates to an aesthetically secure and durable housing for an electrical power strip that is mountable to a wall or other surface.

BACKGROUND OF THE INVENTION

A power strip (also known as a power surge, power board, and by many other variations) is a block of electrical sockets attached to the end of a flexible cable. The power strip allows multiple electrical devices to be powered from a single electrical socket. Power strips are generally used when several electrical devices are in the same general proximity. For example, components of a computer system can share a power strip. A power strip can include a circuit breaker to interrupt the flow of electric current in case of an overload or a short circuit. Some power strips also provide protection against electrical power surges.

Power strips make it convenient to plug multiple electrical devices into an electrical wall outlet. Although a power strip makes it easy to establish multiple electrical connections at the same place, in many instances, the cords of the electrical devices are not arranged in any particular order. Many times, cords run in every direction from the power strip. In some instances, the cords become intertwined which can lead to confusion as to which cord is from which electrical device. This confusion can lead to unintentionally unplugging the wrong device from the power strip. The power strip and cords are usually positioned on the floor beneath the electrical wall outlet, which could lead to someone possibly tripping over one or more of the random cords. In addition to all of the confusion and potential hazards caused by the random arrangement and floor clutter of electrical cords plugged into the power strip, the appearance of these randomly connected cords is also unsightly to view.

Several designs currently exist to enhance the power strip such that the cords are not just randomly connected. U.S. Pat. No. 5,472,157 to Lehrman describes an apparatus that can mount on an ironing board for guiding a cord of an iron and providing a holder for an article. The article has a clamp section for releasably securing the apparatus to the ironing board. A cord support is pivotally attached to the clamp for supporting the electrical cord of the electrical appliance above the ironing board. An article holder is mounted to the clamp for holding an article. An electrical receptacle is carried by the clamp for receiving a plug of the electrical cord of the iron.

U.S. Pat. No. 8,246,364 to Chen describes a power strip that includes a base, a casing, at least one latching member, and at least one first elastic member. The case includes at least one cover. Each cover includes at least one first hook. The cover is able to move between a first position and a second position. Each latching member is slidably connected to the base and includes at least one second hook. Each first elastic member is received in the base and capable of providing a spring force to keep one cover to be in the first position. When the cover is moved to the second position, the first hook engages the second hook to keep the cover in the second position. When the latching member is operated to cause the first hook disengages from the second hook, the cover is pushed to the first position due to the spring force of the first elastic member.

U.S. Pat. No. 6,940,015 to Fang describes A power outlet strip that includes a housing having an upper casing secured to a lower casing and having an opening to receive a cover, the cover includes one or more apertures to receive one or more female receptacles each having two or more holes for receiving prongs. Two or three conductor blades are attached to the female receptacles, and each having one or more spring contacts aligned with the holes of the female receptacle for receiving the prongs. The cover may be changed to the other covers for providing different colors or the like for the outer appearance of the power outlet strip.

U.S. Pat. No. 4,910,362 to Kinner describes a device for securing an electrical outlet cord to an appliance or other surface so that the plug of the cord can be kept snug to the appliance or other surface. The device has a body with a generally flat bottom, which includes an adhesive surface. A channel passes through the body and includes a pair of inwardly directed ribs. The ribs are spaced apart sufficiently to permit insertion of the cord, and once the cord has been inserted, it is held by the inwardly directed ribs. The device can be adhered to an appliance at a position adjacent to where the plug is located after the cord has been wrapped around the appliance to easily hold the cord to the appliance.

Even though these designs and a variety of other power strip and power strip housing are available, there remains a need for an improved housing for a power strip that can arrange the connected electrical cords in an orderly, safe, secure and aesthetic manner.

SUMMARY OF THE INVENTION

This invention is a housing article for storing a power strip device and electrical cords from electrical devices connected to the power strip. This invention is mountable to a wall and comprises an upper surface for supporting a power strip device and a lower surface on which a user will place the electrical cords of the electrical devices connected to the power strip. Clamps attached to the lower surface are used to secure the electrical cords in the area of the lower surface. A user can arrange the electrical cords and then clamp them to produce an orderly bundle of cords and thereby eliminating floor clutter.

DESCRIPTION OF THE INVENTION

Figure 1:
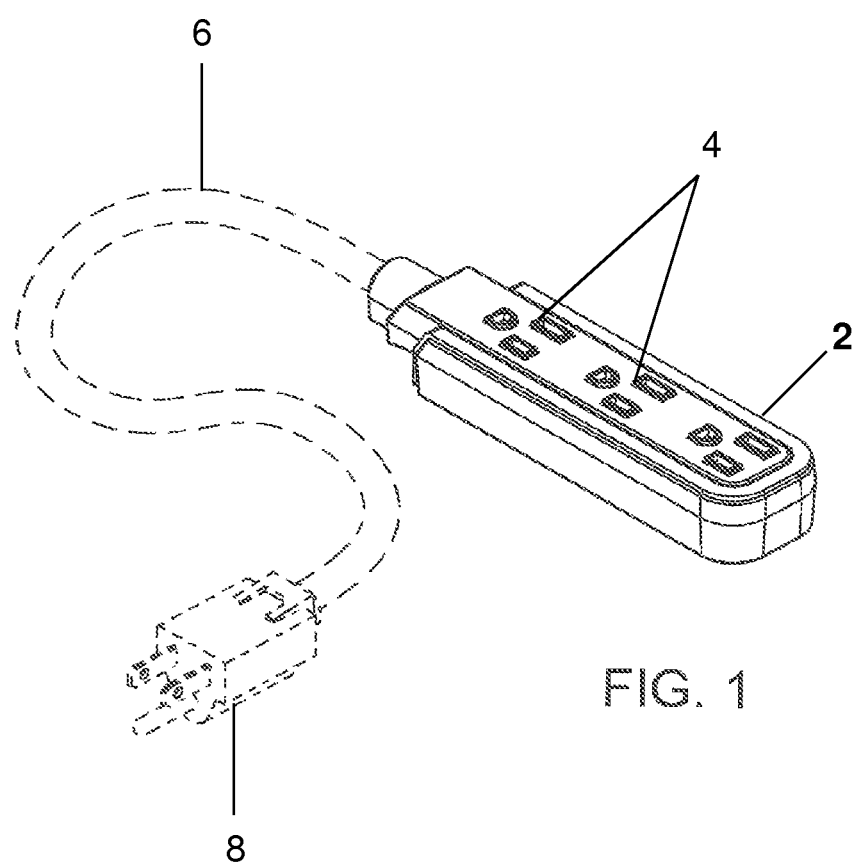
FIG. 1 is a view of a conventional power strip device.

FIG. 1 is a view of a conventional power strip device used by many individuals and business entities. The power strip device serves a function similar to an extension cord in that the power strip facilitates the connecting multiple electrical appliances to electrical power through one electrical wall outlet. As shown, the power strip comprises a base 2 with sockets 4 in which one can plug electrical devices. These sockets only provide a channel through which power flows. The power strip still has to be connected to an electrical power source. The number of sockets in power strip devices can vary. The power strip in FIG. 1 has three sockets. Some power strip devices may have up to eight or ten sockets. The electrical connection of the power strip is accomplished through the electrical cord 6 and plug 8. Although not shown in FIG. 1, conventional power strip devices can have a switch incorporated into the base that will give a user the ability to enable and disable power to the power strip device.

An objective of the present invention is to provide a means to securely and neatly arrange and store a power strip and connected electrical cords from other devices. The electrical cords plugged into the power strip can come from all directions. These cords can become tangled in the power strip. The entanglement of these cords can lead to a user mistakenly unplugging the wrong electrical cord from the power strip. It can also lead to difficulty in finding the desired electrical cord to unplug. In addition, with cords running to the power strip from several directions, when the power strip is positioned underneath the electrical wall outlet, a hazard can exist that could cause a person to accidently trip over one or more electrical cords. The power strip and cords could also get wet from water spills and spills of other liquids.

Figure 2:
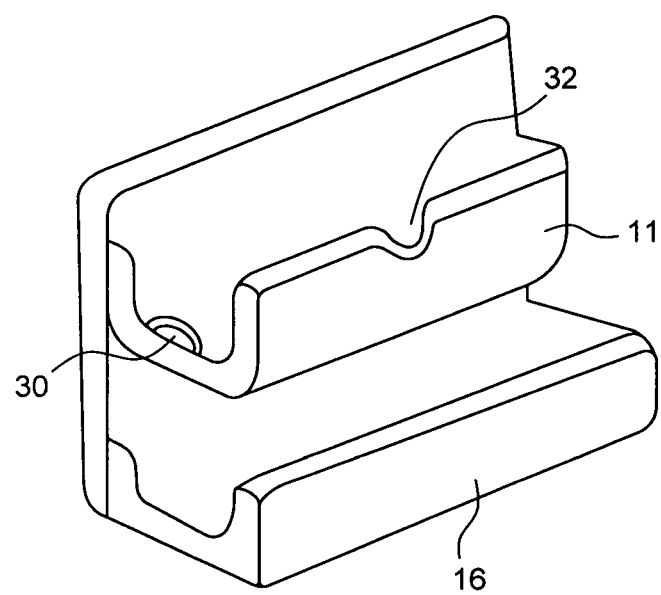
FIG. 2 is a front, side and top view of an embodiment of the electrical power strip housing of the present invention.

FIG. 2 provides an embodiment of a power strip housing of the present invention for storing a power strip device and cords from electrical devices that are plugged into the power strip. This housing comprises a base 34, which can have a generally flat inner surface 36. Attached to the base 34 is an upper tray component 14. This upper tray component extends outward from the inner surface of the base. The outward extension forms a generally horizontal section 38 and a generally vertical section 40 extending upward from the outer edge of the horizontal section. A channel opening 32 is formed in the vertical section 38 through which electrical cords will extend. The upper tray component can have a power cord channel 30. The power cord for the power strip device will extend through this power cord channel and plug into an electrical outlet to supply power to the power strip device. The housing in FIG. 2 further comprises a lower tray component 16. The lower tray component also extends outward from the base 34 in the same manner as the upper tray component. The lower tray component comprises a horizontal section 42 that extends outward from the inner surface of the base and a vertical section 44 that extends upward from the outer edge of the horizontal section.

In the implementation of this invention, a power strip device would be placed on the upper tray component 14 and rest on the horizontal section 38. Cords from electrical devices plugged into the power strip device are channeled through the channel opening 32 and down to the lower tray component 16. The electrical cords are orderly arranged and positioned in the lower tray component 16. Clamps (not shown in FIG. 2) can secure the electrical cords in the lower tray component. The power cord for the power strip component feeds through the power cord channel 30 and plugs into an electrical outlet. The power strip housing of the present invention can hang on a wall or other supportive surface.

Figure 3:
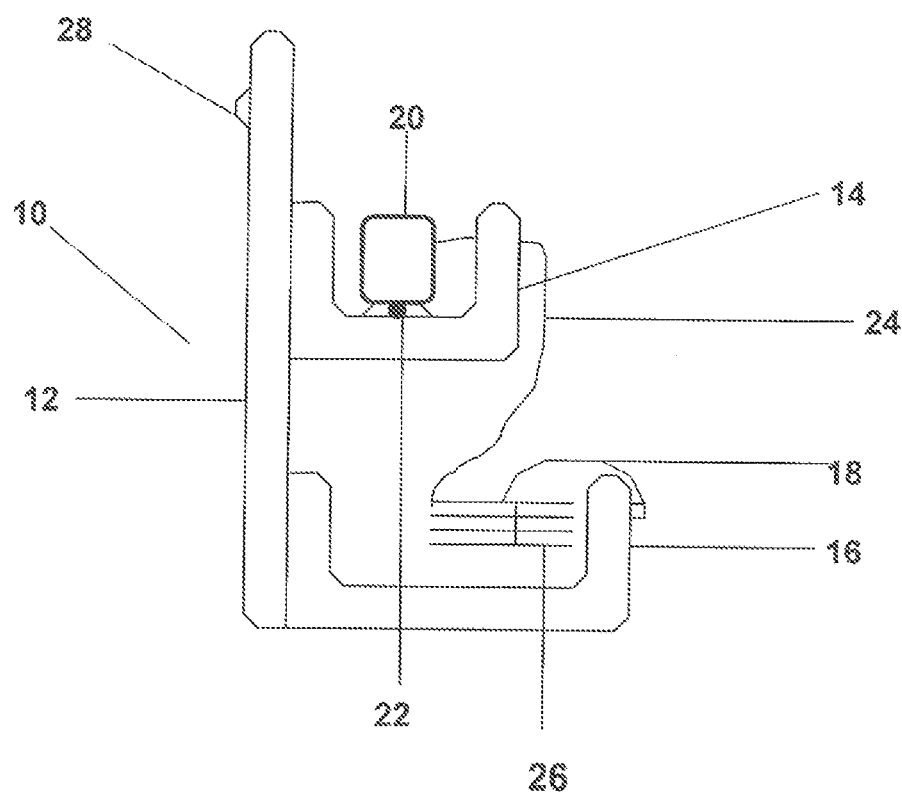
FIG. 3 is a side view of the power strip housing embodiment of FIG. 2.

FIG. 3 is a side view of the power strip housing embodiment of the FIG. 2. As shown, the housing base 12 supports the upper tray component 14 and lower tray component 16. A power strip 20 rests on the upper tray component. Electrical cords 24 connected to the power strip extend through the channel opening down to the lower tray component. The electrical cords 24 can form a cord bundle 26 which is secured in the lower tray component by one or more clamps. Power cord 22 for the power strip device 20 will extend through the power cord channel and plug into an electrical outlet. An attachment means 28 provides the capability to mount the power strip housing device to a wall.

Figure 4:
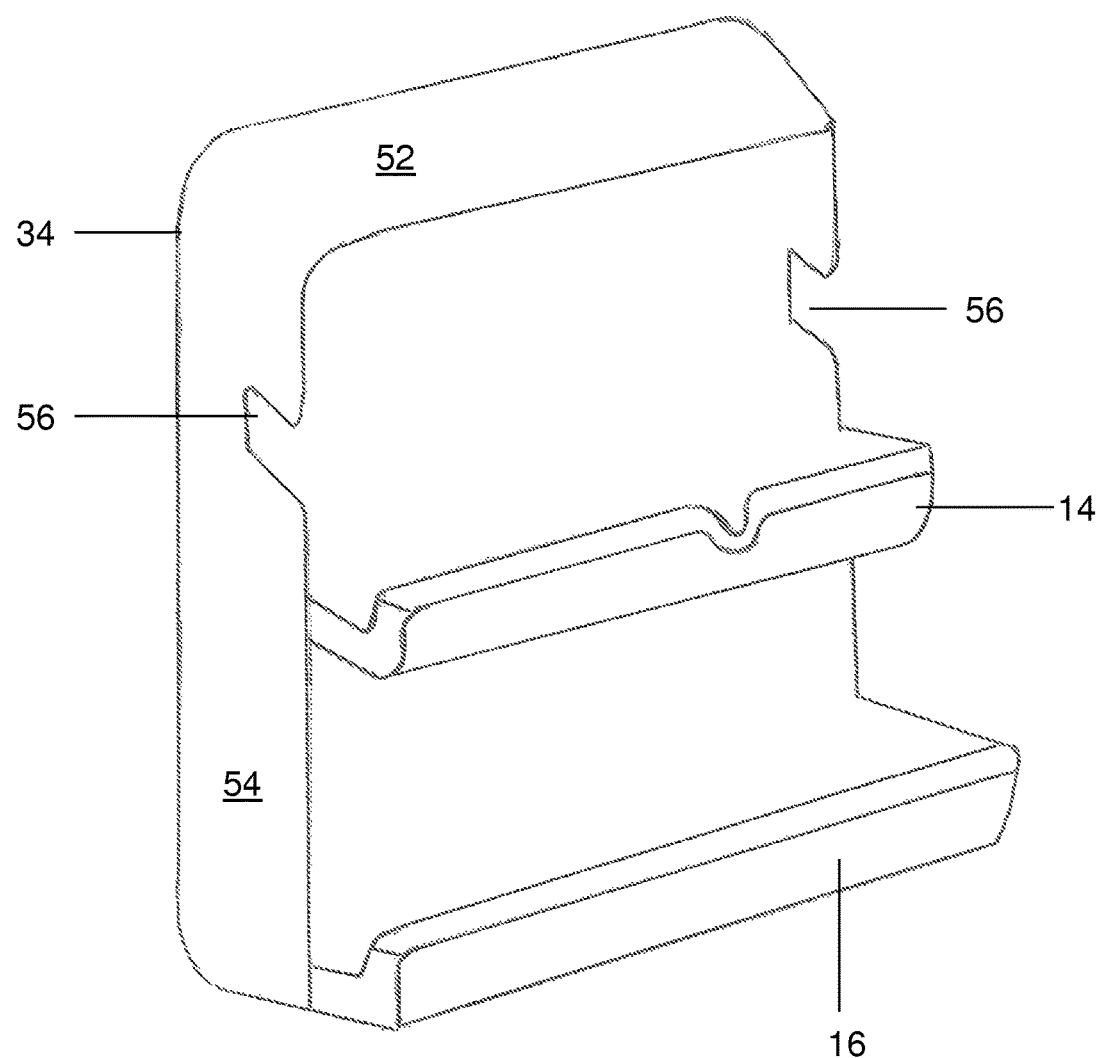
FIG. 4 is a view of an alternate embodiment of the electrical power strip housing of the present invention.

FIG. 4 is a view of an alternate embodiment of the electrical power strip housing of the present invention. This embodiment contains the same basic features as the embodiment described in FIGS. 2 and 3. The main common components of the two embodiments are the upper tray component 14 and the lower tray component 16. In this embodiment, the upper edge 52 of the base 34 extends outward from the inner surface of the base and forms a top cover. In the same manner, the vertical side edges 54 of the base 34 also extend outward from the base. Both the upper edge 52 and vertical sides 54 extend away from the base 34 in a direction parallel to the outward extension of the upper tray component and the lower tray component. Slit openings 56 in the vertical side edges provide a channel through which the electrical cord from the power strip device can extend to an electrical outlet. With the extensions of the housing sides and top, this embodiment creates a more enclosed design to house and contain the power strip.

Figure 5:
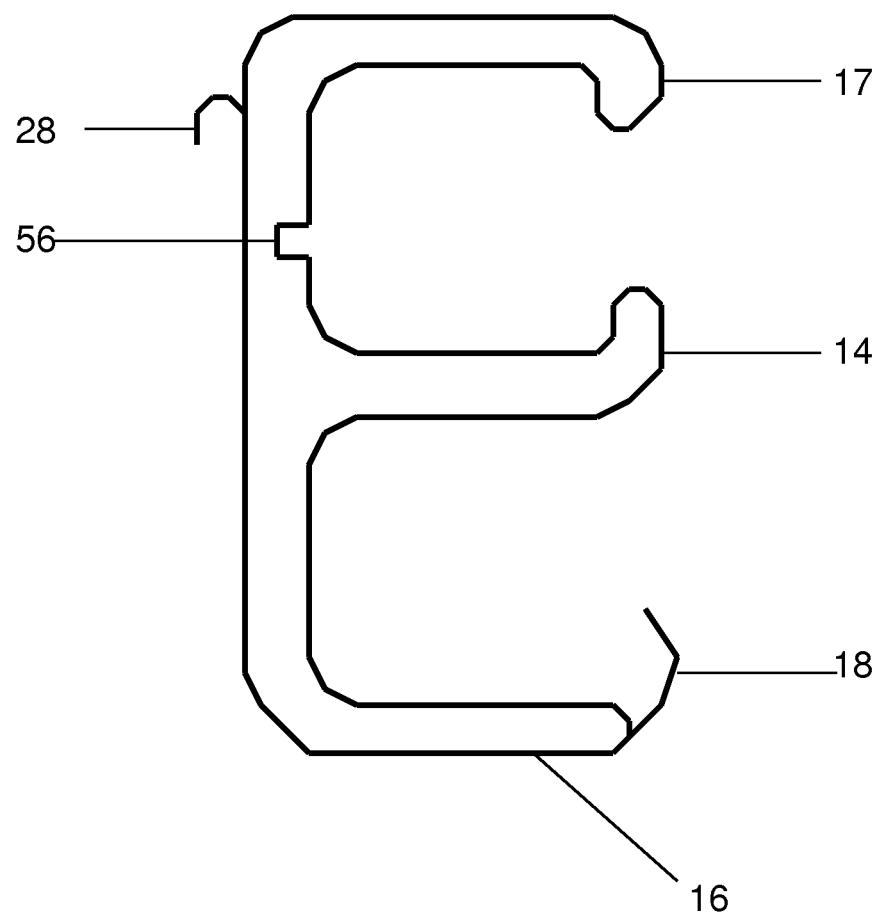
FIG. 5 is a side view of an embodiment of an electrical power strip housing of the present invention.

FIG. 5 is a side view of an alternate embodiment of an electrical power strip housing of the present invention. Similar to the embodiment described in FIG. 4, the power strip housing has a top extension 17 that extends from the power strip base as well as the upper tray component 14 and lower tray component 16. A clamp device 18 attaches to the lower tray component for securing electrical cords from devices plugged into the power strip. Slits 56 on the vertical sides of the housing provide a channel through which to extend a power cord. Also shown is the attachment means 28 for mounting the power strip housing to a wall.

Figure 6:
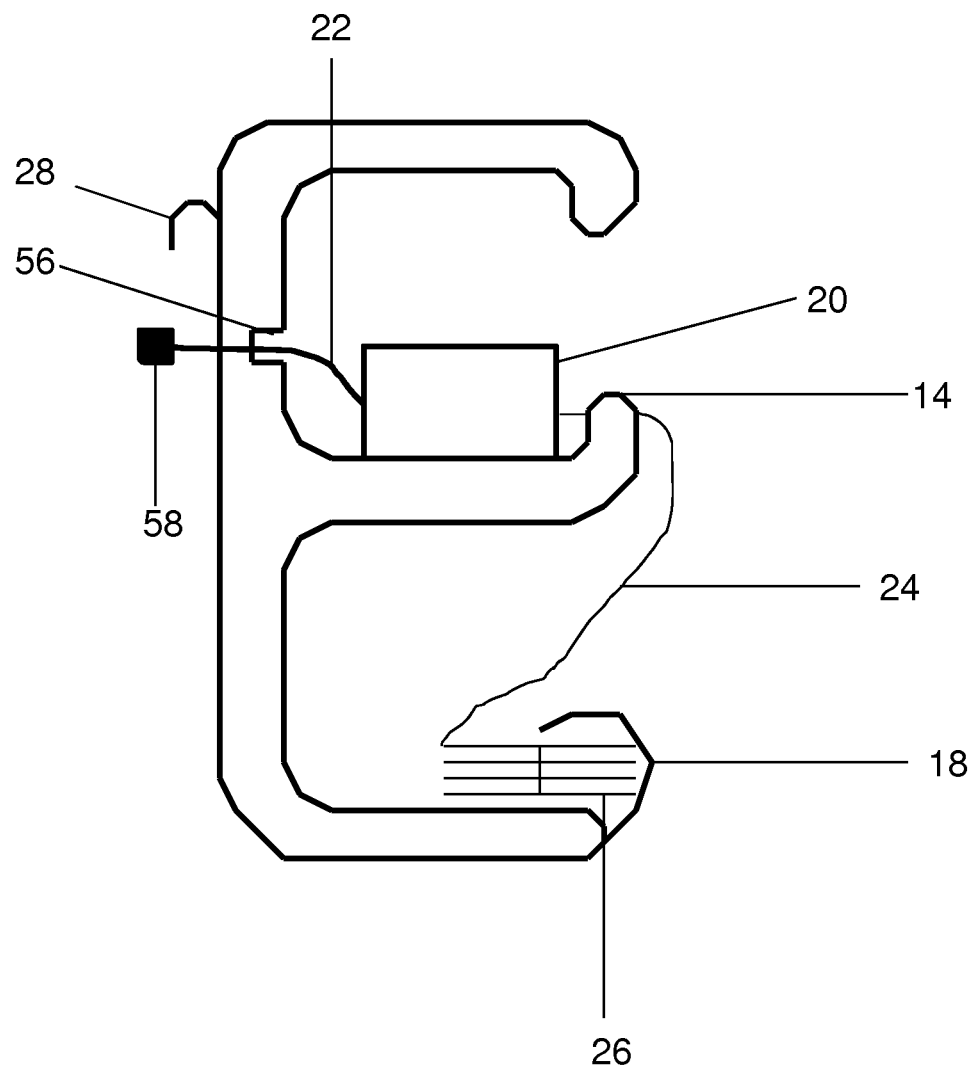
FIG. 6 is a side view of an embodiment of an electrical power strip housing of the present invention showing a power strip device and wires connected to the power strip device.

FIG. 6 is a side view of an embodiment of an electrical power strip housing of the present invention showing a power strip device and wires connected to the power strip device. The power strip 20 is positioned in the upper tray 14 of the power strip housing. The power strip cord 22 extends through the slit 56. This cord 22 plugs into electrical outlet 58. The electrical cords 24 from the electrical devices extend down to the lower tray and can be formed into a bundle of cords 26. The clamp 18 will secure the electrical cord bundle in the lower tray. The hook 28 facilitates attaching or mounting the power strip housing to a wall.

Figure 7:
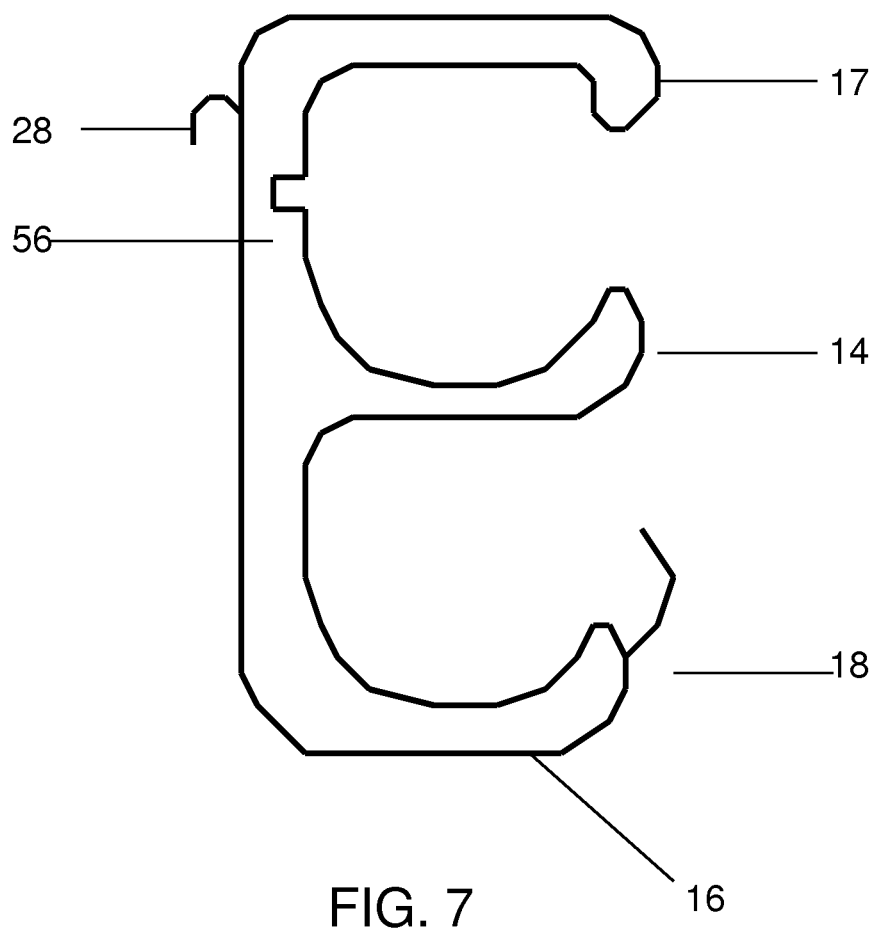
FIG. 7 is a side view of an alternate embodiment of an electrical power strip housing of the present invention.
Figure 8:
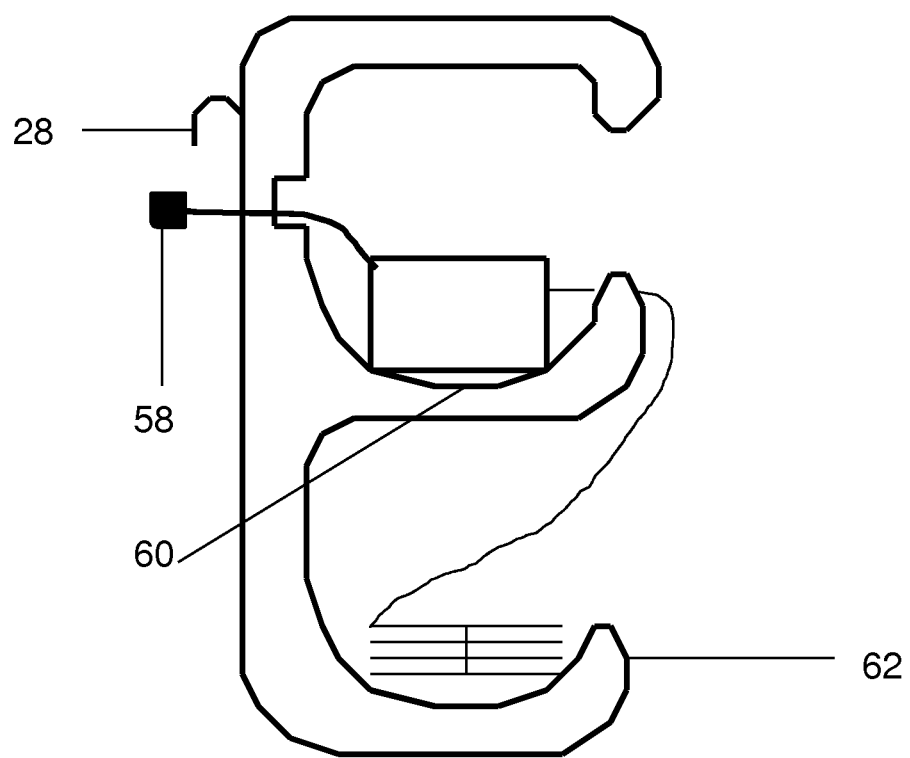
FIG. 8 is a side view of an alternate embodiment of an electrical power strip housing of the present invention showing a power strip device and wires connected to the power strip device.

FIGS. 7 and 8 show side views of an alternate embodiment of an electrical power strip housing of the present invention. In this embodiment, the upper and lower trays have U-shaped configurations. A shown in FIG. 8, when a power strip is placed on the upper tray, a clearance 60 is formed under the power strip. When the power strip is positioned on a tray with a flat surface, no clearance is formed. This clearance can provide a form of ventilation that will reduce any potential heat build up from the power strip. This clearance can also be used as a channel through which cords can be positioned under the power strip if needed or desired.

Regarding the lower tray, the U-shape configuration can also provide advantages over other embodiments. First, the U-shape of the lower tray provides an upward shaped outer edge 62. The upward extended outer edge can function in a manner similar to the hook element 18 of the embodiment of FIG. 5.

Figure 9:
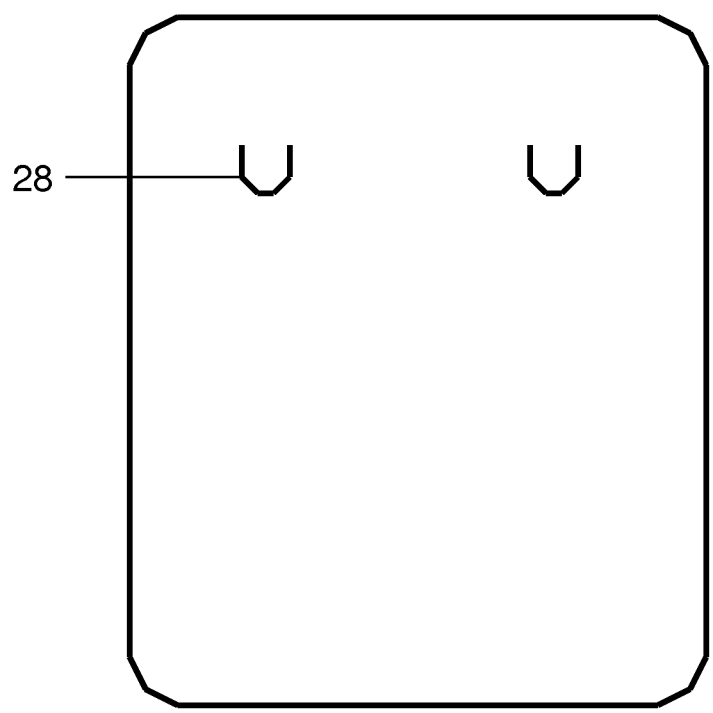
FIG. 9 is a back view of the power strip housing of the present invention.

FIG. 9 is a back view of the power strip housing of the present invention. As previously stated, the power strip housing can be mounted to a wall to decrease the possibility of someone tripping over the power surge and/or the electrical cords on the floor, and other hazardous mishaps that could occur. The attachment means (in many instances hooks) will attach to the backside of the housing. This power strip housing's backside can have a generally smooth surface that can better accommodate the hook attachment means.

While the present invention has been illustrated by the description of embodiments thereof, and while the embodiments have been described in some detail, it is not the intention of the applicant to restrict or in any way limit the scope of the invention to such details. Additional advantages and modifications will readily appear to those skilled in the art. The invention in its broader aspects is not limited to the specific details, representative apparatus and methods, and illustrative examples shown and described. Accordingly, departures may be made from such details without departing from the spirit or scope of the applicant's general inventive concept.

I claim:

1. A housing article for holding an electrical power strip device that connects multiple electrical devices to an electrical power source and for organizing power cords from the multiple electrical devices that are connected to the housing article, said housing article comprising:

a base member having a generally rectangular shape with a front side having a smooth flat surface, a back side parallel to the front side and having a smooth surface, top, bottom and side edges connecting said front and back sides;

a generally flat and smooth top surface attached to the top edge of said base member and having a generally horizontal section extending outward from said base member and a generally vertical section connected to and extending downward from said horizontal member, said top surface creating a partially enclosed section for housing the electrical power strip;

an upper tray for holding an electrical power strip device, said upper tray being connected to the front side surface of said base member and having a generally U-shaped extending outward and upward from said base member and a partial opening in an outer portion that forms a channel through which electrical cords, connected to an electrical power strip positioned on said upper tray, are fed through; and a lower tray for receiving electrical cords fed from said upper tray and for storing electrical cords from multiple electrical devices that are connected to the electrical power strip positioned on said upper tray, said lower tray being connected to the front side surface of said base member and having a generally U-shaped extending outward and upward from said base member and forming a storage area in which electrical cords, from multiple electrical devices that are connected to the power strip, are stored;

and a fastening element attached to an outer edge of said generally horizontal section of said lower tray to secure electrical cords fed from said upper tray.

2. The housing article of claim 1, wherein said U-shaped of said upper tray causes a clearance to be formed under an electrical power strip when the electrical power strip is positioned on the upper tray.

3. The housing article of claim 1, further comprising an arc element attached to an upper side of said upper tray, said arc element creating a channel through which an electrical cord from electrical power strip positioned on said upper tray extends and connects to an electrical outlet.

4. The housing article of claim 1, further comprising one or more hook elements to facilitate attaching or mounting the power strip housing to a wall.

5. The housing article of claim 1, further comprising a left side wall section and a right side wall section, each said wall section being attached to one side of said base member and extending outward from said base member thereby creating a partial enclosure of said upper and lower trays.

6. The housing article of claim 1, wherein said base member, said upper tray and said lower tray form a piece of the housing.

* * * * *